United States Patent
Markovic et al.

(10) Patent No.: US 11,537,596 B2
(45) Date of Patent: Dec. 27, 2022

(54) DOMAIN DATA MANAGEMENT SERVICES

(71) Applicant: Schlumberger Technology Corporation, Sugar Land, TX (US)

(72) Inventors: Hrvoje Markovic, Mountain View, CA (US); Hans Eric Klumpen, Sugar Land, TX (US); RajKumar Kannan, Houston, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 0 days.

(21) Appl. No.: 16/908,710

(22) Filed: Jun. 22, 2020

(65) Prior Publication Data
US 2021/0049155 A1 Feb. 18, 2021

Related U.S. Application Data

(60) Provisional application No. 62/863,301, filed on Jun. 19, 2019.

(51) Int. Cl.
*G06F 16/23* (2019.01)
*G06F 16/2455* (2019.01)

(52) U.S. Cl.
CPC .... *G06F 16/2379* (2019.01); *G06F 16/24553* (2019.01)

(58) Field of Classification Search
CPC .......... G06F 16/2379; G06F 16/24553; G06F 16/254
See application file for complete search history.

(56) References Cited

U.S. PATENT DOCUMENTS

| | | | | |
|---|---|---|---|---|
| 9,684,544 | B1* | 6/2017 | Bequet | H04L 67/10 |
| 2014/0136513 | A1* | 5/2014 | Ailamaki | G06F 16/2272 |
| | | | | 707/718 |
| 2018/0046779 | A1* | 2/2018 | Millen | G16H 10/20 |
| 2018/0276267 | A1* | 9/2018 | Bestler | G06F 16/13 |
| 2019/0138654 | A1* | 5/2019 | Arora | G06F 9/45558 |
| 2019/0146998 | A1* | 5/2019 | Jin | G06F 16/25 |
| | | | | 718/104 |
| 2019/0238574 | A1* | 8/2019 | Iliofotou | H04L 63/1433 |
| 2019/0286934 | A1* | 9/2019 | Lai | G06K 9/00449 |

* cited by examiner

*Primary Examiner* — Apu M Mofiz
*Assistant Examiner* — Oscar Wehovz
(74) *Attorney, Agent, or Firm* — Michael Guthrie

(57) ABSTRACT

A method includes registering a type of data file. Registering the type of data file includes storing metadata describing the type of data file, the metadata including a file storage service and a parser for the type of data file. The method includes receiving a first data file of the type from a first domain, the first data file having raw data, storing the first data file, storing one or more access rules and a lineage of the first data file, parsing the first data file using the parser to generate a content from the raw data, storing the content separately from the raw data, providing the first data file and the content to a search service, and automatically updating one or more second data files from one or more other domains based on the content of the first data file using the search service and the lineage.

20 Claims, 12 Drawing Sheets

DOMAIN DATA MANAGEMENT SERVICES

CROSS-REFERENCE TO RELATED APPLICATIONS

This application claims priority to U.S. Provisional Application having Ser. No. 62/863,301, which was filed on Jun. 19, 2019, and is incorporated by reference herein in its entirety.

BACKGROUND

In the oil and gas field, and elsewhere, various data management systems are employed to store and provide access to data, e.g., in cloud-based or "distributed" systems. In such systems, applications may be employed as part of workflows in various domains. The applications may transform data according to a schema. The stored data may then be retrieved, appended, and saved again, e.g., in a versioning system. This allows retrieval of past version, which may be beneficial in many contexts.

However, when transforming data, the output of many such applications may not be able to be reverted to its source data. This presents a difficulty when different types of applications may be working from the same data. As information is gleaned by one application about the data, it would be advantageous to update the information used by other applications; however, because the transformed data may not be usable by the other applications, this may present issues that result in redundant work being conducted, or insights into the data not being carried through reliably across applications or domains.

SUMMARY

Embodiments of the disclosure may provide a method that includes registering a type of data file. Registering the type of data file includes storing metadata describing the type of data file, the metadata including a file storage service and a parser for the type of data file. The method also includes receiving a first data file of the type of data file from a first domain, the first data file including raw data, storing the first data file using the file storage service, storing one or more access rules and a lineage of the first data file using a kernel storage service, parsing the first data file using the parser to generate a content from the raw data, storing the content using a content storage service, separately from the raw data, providing the first data file and the content to a search service, and automatically updating one or more second data files from one or more other domains based on the content of the first data file using the search service and the lineage.

In an embodiment, the method may include indexing the first data file using a first identifier. The content, the lineage, and the access rules are associated with and accessible using the first identifier.

In an embodiment, registering further includes storing a trigger for the parser. The parser parses the first data file in response to the trigger being true.

In an embodiment, the lineage specifies one or more data files or one or more data objects from which the first data file was at least partially derived In an embodiment, the type of data file is a well log file storing one or more logs of sensor measurements taken from one or more wells.

In an embodiment, the type of data file is an unstructured, text-based data file.

In an embodiment, the method also includes receiving a request for the first data file from a user, determining that the access controls permit the first data file to be provided to the user, and providing the first data file to the user.

In an embodiment, the method further includes receiving a request for a file store that includes the first data file, determining that the access controls permit the file store to be provided to the user, providing the file store to the user.

Embodiments of the disclosure further provide a non-transitory, computer-readable medium storing instructions that, when executed by at least one processor of a computer system, cause the computer system to perform operations. The operations include registering a type of data file. Registering the type of data file includes storing metadata describing the type of data file, the metadata including a file storage service and a parser for the type of data file. The operations also include receiving a first data file of the type of data file from a first domain, the first data file including raw data, storing the first data file using the file storage service, storing one or more access rules and a lineage of the first data file using a kernel storage service, parsing the first data file using the parser to generate a content from the raw data, storing the content using a content storage service, separately from the raw data, providing the first data file and the content to a search service, and automatically updating one or more second data files from one or more other domains based on the content of the first data file using the search service and the lineage.

Embodiments of the disclosure also provide a computing system including one or more processors and a memory system including one or more non-transitory, computer-readable media storing instructions that, when executed by at least one of the one or more processors, cause the computer system to perform operations. The operations include registering a type of data file. Registering the type of data file includes storing metadata describing the type of data file, the metadata including a file storage service and a parser for the type of data file. The operations also include receiving a first data file of the type of data file from a first domain, the first data file including raw data, storing the first data file using the file storage service, storing one or more access rules and a lineage of the first data file using a kernel storage service, parsing the first data file using the parser to generate a content from the raw data, storing the content using a content storage service, separately from the raw data, providing the first data file and the content to a search service, and automatically updating one or more second data files from one or more other domains based on the content of the first data file using the search service and the lineage.

It will be appreciated that this summary is intended merely to introduce some aspects of the present methods, systems, and media, which are more fully described and/or claimed below. Accordingly, this summary is not intended to be limiting.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the present disclosure. The first object or step, and the second object or step, are both, objects or steps, respectively, but they are not to be considered the same object or step.

The terminology used in the description herein is for the purpose of describing particular embodiments and is not intended to be limiting. As used in this description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques, and workflows that are in accordance with some embodiments. Some operations in the processing procedures, methods, techniques, and workflows disclosed herein may be combined and/or the order of some operations may be changed.

Figure 1:
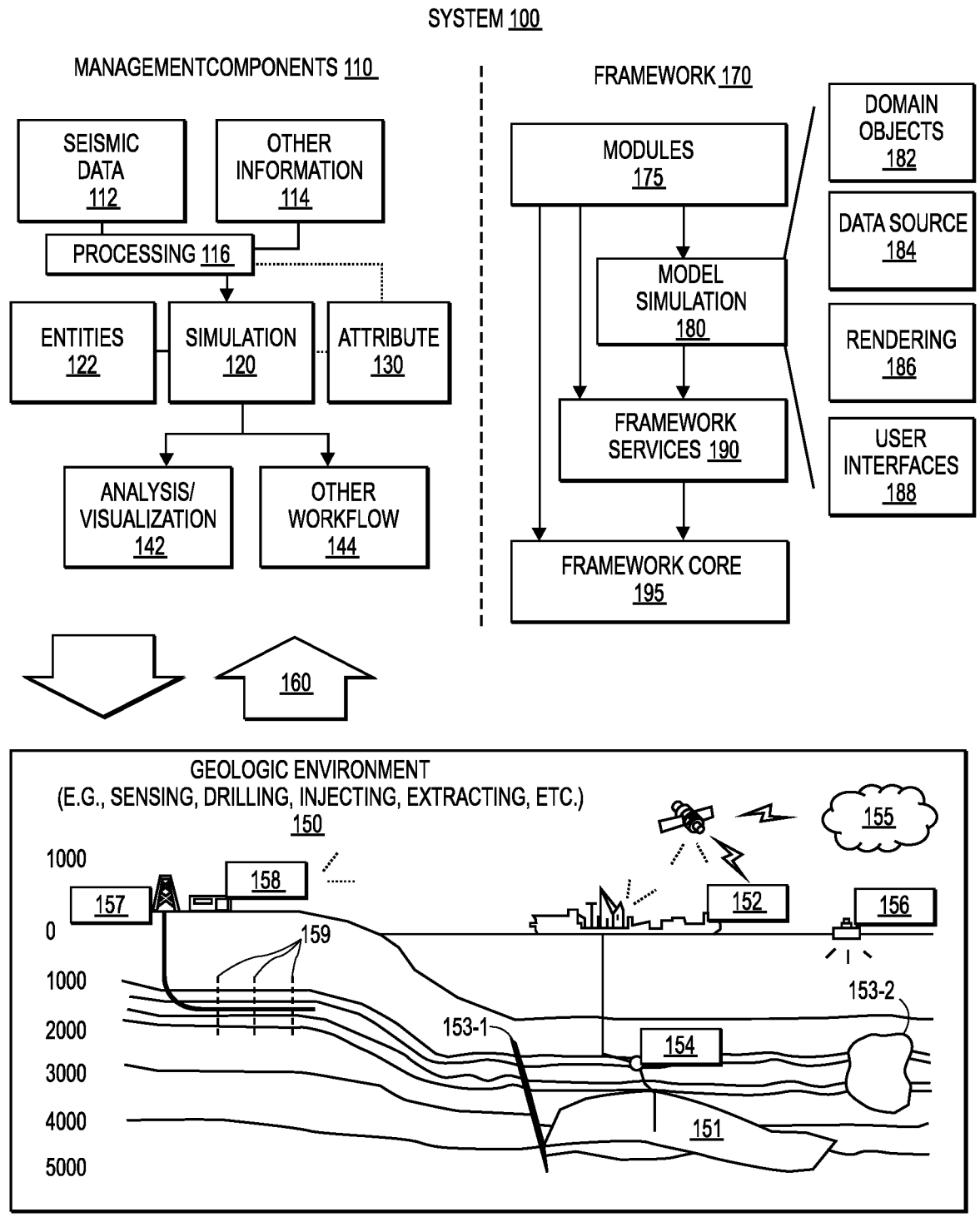
FIG. 1 illustrates an example of a system that includes various management components to manage various aspects of a geologic environment, according to an embodiment.

FIG. 1 illustrates an example of a system 100 that includes various management components 110 to manage various aspects of a geologic environment 150 (e.g., an environment that includes a sedimentary basin, a reservoir 151, one or more faults 153-1, one or more geobodies 153-2, etc.). For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116, a simulation component 120, an attribute component 130, an analysis/visualization component 142 and a workflow component 144. In operation, seismic data and other information provided per the components 112 and 114 may be input to the simulation component 120.

In an example embodiment, the simulation component 120 may rely on entities 122. Entities 122 may include earth entities or geological objects such as wells, surfaces, bodies, reservoirs, etc. In the system 100, the entities 122 can include virtual representations of actual physical entities that are reconstructed for purposes of simulation. The entities 122 may include entities based on data acquired via sensing, observation, etc. (e.g., the seismic data 112 and other information 114). An entity may be characterized by one or more properties (e.g., a geometrical pillar grid entity of an earth model may be characterized by a porosity property). Such properties may represent one or more measurements (e.g., acquired data), calculations, etc.

In an example embodiment, the simulation component 120 may operate in conjunction with a software framework such as an object-based framework. In such a framework, entities may include entities based on pre-defined classes to facilitate modeling and simulation. A commercially available example of an object-based framework is the MICROSOFT® NET® framework (Redmond, Wash.), which provides a set of extensible object classes. In the .NET® framework, an object class encapsulates a module of reusable code and associated data structures. Object classes can be used to instantiate object instances for use in by a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results (e.g., simulation results, etc.). As an example, output from the simulation component 120 may be input to one or more other workflows, as indicated by a workflow component 144.

As an example, the simulation component 120 may include one or more features of a simulator such as the ECLIPSE™ reservoir simulator (Schlumberger Limited, Houston Tex.), the INTERSECT™ reservoir simulator (Schlumberger Limited, Houston Tex.), etc. As an example, a simulation component, a simulator, etc. may include features to implement one or more meshless techniques (e.g., to solve one or more equations, etc.). As an example, a reservoir or reservoirs may be simulated with respect to one or more enhanced recovery techniques (e.g., consider a thermal process such as SAGD, etc.).

In an example embodiment, the management components 110 may include features of a commercially available framework such as the PETREL® seismic to simulation software framework (Schlumberger Limited, Houston, Tex.). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of modeling, simulating, etc.).

In an example embodiment, various aspects of the management components 110 may include add-ons or plug-ins that operate according to specifications of a framework environment. For example, a commercially available framework environment marketed as the OCEAN® framework environment (Schlumberger Limited, Houston, Tex.) allows for integration of add-ons (or plug-ins) into a PETREL® framework workflow. The OCEAN® framework environment leverages .NET® tools (Microsoft Corporation, Redmond, Wash.) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a modules layer 175. The framework 170 may include the commercially available OCEAN® framework where the model simulation layer 180 is the commercially available PETREL® model-centric software package that hosts OCEAN® framework applications. In an example embodiment, the PETREL® software may be considered a data-driven application. The PETREL® software can include a framework for model building and visualization.

As an example, a framework may include features for implementing one or more mesh generation techniques. For example, a framework may include an input component for receipt of information from interpretation of seismic data, one or more attributes based at least in part on seismic data, log data, image data, etc. Such a framework may include a mesh generation component that processes input information, optionally in conjunction with other information, to generate a mesh.

In the example of FIG. 1, the model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

As an example, the domain objects 182 can include entity objects, property objects and optionally other objects. Entity objects may be used to geometrically represent wells, surfaces, bodies, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1, the geologic environment 150 may include layers (e.g., stratification) that include a reservoir 151 and one or more other features such as the fault 153-1, the geobody 153-2, etc. As an example, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or instead include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As mentioned, the system 100 may be used to perform one or more workflows. A workflow may be a process that includes a number of worksteps. A workstep may operate on data, for example, to create new data, to update existing data, etc. As an example, a may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on seismic data, seismic attribute(s), etc. As an example, a workflow may be a process implementable in the OCEAN® framework. As an example, a workflow may include one or more worksteps that access a module such as a plug-in (e.g., external executable code, etc.).

Figure 2:
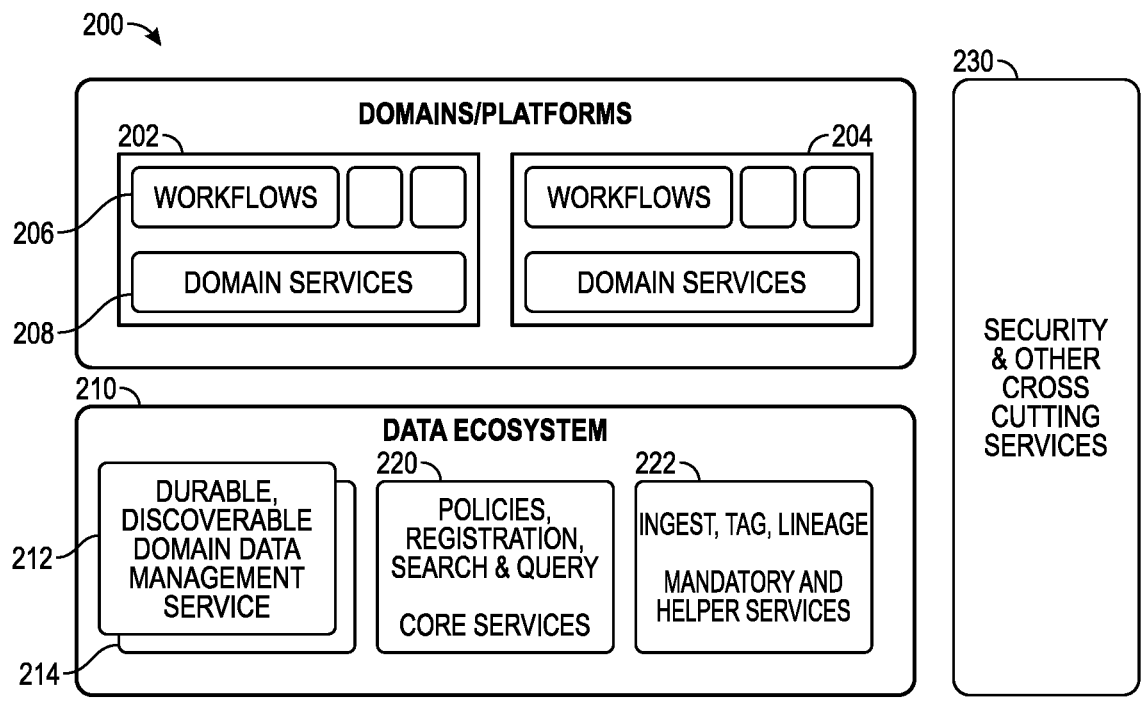
FIG. 2 illustrates a conceptual view of a system architecture created using one or more domain data management services (DDMSs), according to an embodiment.

FIG. 2 illustrates a conceptual view of a system architecture 200 created using one or more domain data management services (DDMSs), according to an embodiment. As shown, the architecture 200 may include one or more domains or platforms 202, 204, which may each implement one or more workflows 206 as part of domain services 208. Domains generally refer to field of work, and a platform may refer to a software application (or applications) that are employed to perform tasks in the respective fields. For example, seismic processing may be a domain, and may be separate from well log processing, and different software platforms may be provided for these two domains. The different software may employ different schema for data storage and acquisition. Furthermore, data acquired in one domain may affect data output in another domain. For example, seismic models may employ well logs to make initial estimations for velocity models. When a well log is updated, it thus may impact the velocity model, and thus the processing of the seismic data. This can start a domino effect of updates, as once the velocity model changes, the generated seismic images may change, leading to changed seismic attributes, etc. This file dependency, where one file depends upon another, even outside of its domain, may be referred to as a "lineage" of the file, as will be described in greater detail below.

In addition, the different domains/platforms may store and/or use data according to different schemes. These schemes often call for the data to be transformed from the raw data to a more usable content (e.g., from binary to images). However, this transformation may not be fully bi-directional, and thus processing the raw data for use in the specific domain can be problematic in instances where the original, raw data may be changed in view of changes from data acquired in other domains.

Accordingly, the architecture 200 may have a data ecosystem 210 (e.g., where data and content are stored and indexed for searching, etc.) that includes a plurality of domain data management services (DDMSs) 212, 214. In this example, one DDMS 212 is provided for the domain 202, and another is provided for the domain 204. This one-to-one relationship is merely an example, however, and some domains may have two or more DDMSs associated therewith and/or two different domains may have one DDMS servicing both. The data ecosystem 210 may also include a core services module 220 and a "mandatory" and helper services module 222. The term "mandatory" should not be read as being required by the architecture 210 or any other aspect of the present disclosure; rather, it is used to refer to access controls that may be called for (mandated) by industry or governmental regulatory bodies. Further, the functions provided by the module 222 may include lineage history, security and access controls, etc.

The core services 220 module may provide for polices, registration, and search and query functions. This may also be referred to as a hub service, as will be described below. The core services may contain application program interface (API) libraries that enable access to federated indices, e.g., providing reference to raw data files and parsed content stored by different domains. Registration functions may include establishing DDMSs, file types or object types within a DDMS, etc.

The architecture 200 may also include a security layer 230. The security layer 230 may impose "cross-cutting" services, e.g., regulating (e.g., allowing or blocking) exposure of data as between domains, between cloud storage providers, etc. Accordingly, data may be passed between the data ecosystem 210 and the domains 202, 204 via the security layer 230, or prevented from passing therebetween, depending on the request and the applied access rules.

Figure 3:
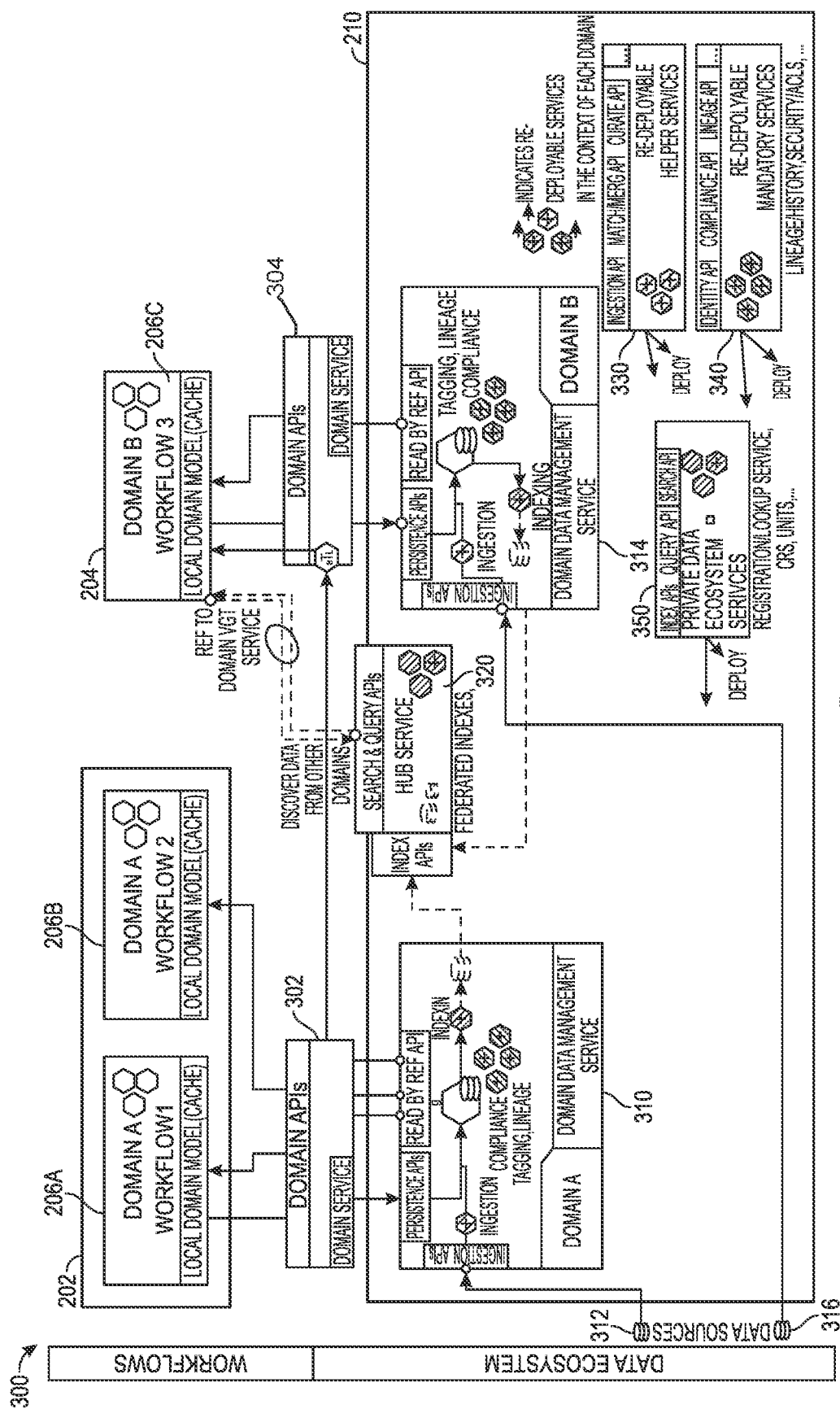
FIG. 3 illustrates another conceptual view of the architecture, according to an embodiment.

FIG. 3 illustrates another conceptual view of the architecture 300, according to an embodiment. The view of FIG. 3 may be similar to that of FIG. 2, but shows additional details of an embodiment. For example, the architecture 300 may include the domains 202, 204 and the data ecosystem 210. Within the individual domains 202, 204, workflows 206A, 206B, 206C may be executed. Domain APIs 302, 304 may provide an interface between the domains 202, 204, which may enable communication between the domains 202, 204 and the ecosystem 210.

The data ecosystem 210 may include several DDMS modules, which may cooperatively store raw data, parse the raw data, index the files, manage file lineage, and enforce access controls, among other possible functions. The different DDMS modules may operate differently, e.g., according to the domain 202, 204 and/or workflow with which they are associated.

For example, the data ecosystem 210 may include a first DDMS 310, which may be configured to manage data ingested from and/or consumed by the domain 202, via the domain API 302. The DDMS 310 may include persistence APIs, which may be configured to communicate with storage services (e.g., cloud storage) to store files and content in locations from which the data is retrievable. The DDMS 310 may also include a read-by-reference API, which is able to provide data in response to identifiers (e.g., global identifiers), as will be discussed below. The DDMS 310 may further include ingestion APIs, which interface with data source 312, so as to execute ingestion routines (e.g., in response to receiving a new data file from one of the domains 202, 204). The DDMS 310 may also be configured to apply and store compliance, tagging, and lineage data to the data files that are received (ingested) from the domain 202. The DDMS 310 may also index the data files, e.g., using the global identifier mentioned above, and generate an index database, which may allow for retrieval of the files, content, etc. by reference to the global identifier.

The data ecosystem 210 may include a second DDMS 314, which may be similar to the DDMS 310, except that it is tailored for use with the domain 204, and thus may store different file types, use different parsers (or other "augmenters" that may classify, parse, or otherwise enrich the raw data) to generate content, and apply different tags and/or compliance rules. The DDMS 314 may communicate with another data source 316, so as to store data therein and/or receive data therefrom. It will be appreciated that the data sources 312, 316 may each refer to two or more cloud service providers.

The DDMSs 310, 314 may be configured to communicate data therebetween to permit updating of files, e.g., based on lineage, as discussed above. A hub service DDMS 320 may be provided to manage such communication. The hub service DDMS 320 may be configured to store a federated index of the data files, content, and other information received into the data ecosystem by the different domains. The hub service DDMS 320 may thus provide for discovery of data across domains, e.g., as shown, via communication directly with the domain 204.

The ecosystem 210 may further include a DDMS 330 for helper services, e.g., providing ingestion APIs, match/merge APIs, and curate APIs. The ecosystem 210 may also include a DDMS 340 for "mandatory" service, e.g., lineage history, security, etc., which may establish access rules, enforce the access rules (e.g., as between domains), and enable updates across data file types according to file dependencies (e.g., lineage). In addition, the ecosystem 210 may also include a private data DDMS 350. The DDMS 350 may manage backend processes that are not exposed to the domains 202, 204, but may be used by the other DDMSs, e.g., index APIs, query APIs, search APIs, etc. The private DDMS 350 may provide registration control for the DDMS instantiation, look up services, etc.

The DDMSs may each implement general architectural principles. The principles may include preserving raw data through ingestion and retention. Further, the data may be globally identifiable, such that context-specific data identity prevents leveraging data. Further, the data may be generally immutable, e.g., metadata may be entirely immutable, while transient data may be subject to cost consideration and/or versioning. Further, data access may be controlled, such that access is permitted to authorized entities and prevented from exposure to unauthorized entities. Further, data is governed for the right of use, such that data compliance is enforced in the entry/exit points. The data is discoverable, with the DDMSs each providing an index for the data. The data is consumable, as the DDMS service is registered and during registration provides a standardized way of consuming data. Updated data is new data, as enrichment results in new data. Data lineage is tracked, as the workflows may be called to provide and preserve lineages. Data is owned and managed by producers such that data persistence and management may be decentralized. Finally, data may be referenced, as copies of data are possible in different consumption zones (e.g., data ponds) but domain data management stores are the primary sources of data (e.g., a ground truth).

Figure 4:
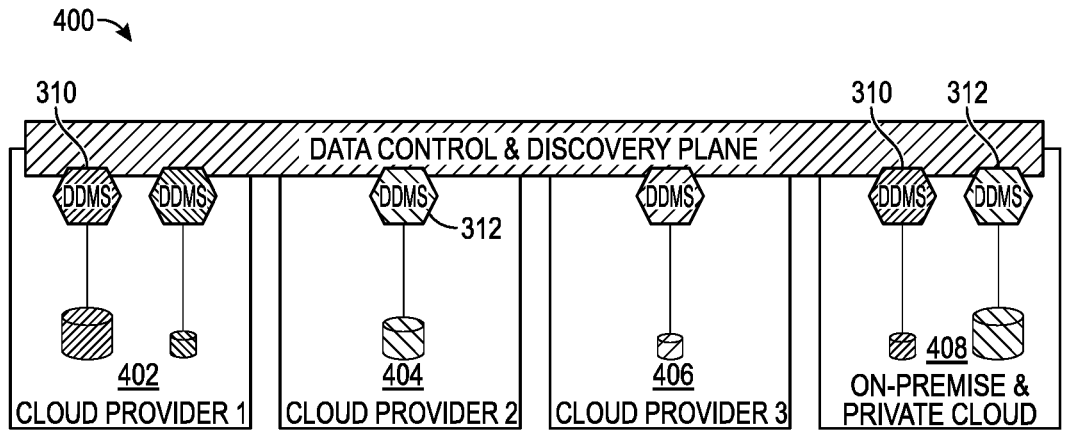
FIG. 4 illustrates a conceptual view of a distributed data storage architecture, which may be implemented to store the data files as part of the overall architecture of FIGS. 2 and 3, according to an embodiment.

FIG. 4 illustrates a conceptual view of a distributed data storage architecture 400, which may be implemented to store the data files as part of the overall architecture 200 discussed above, according to an embodiment. The architecture 400 may include multiple (in this case, three) cloud providers 402, 404, 406, which may be assigned to store different types of data, data files/content from different domains or owned by different entities, etc. Further, the data may be stored locally (on-premises) or in a private cloud, as indicated at 408 (referred to as "on-premise storage" 408 hereinafter for brevity but not by way of limitation). In such a distributed architecture 400, the DDMSs may be configured to communicate with the different file storage locations provided by the different clouds. For example, the DDMS 310 may communicate with the cloud provider 402 and the on-premises storage 408. Likewise, the DDMS 312 may communicate with the cloud provider 404 and the on-premise storage 408. The other DDMSs shown may communicate any one or more of the cloud service providers 402-406, as desired.

Figure 5A:
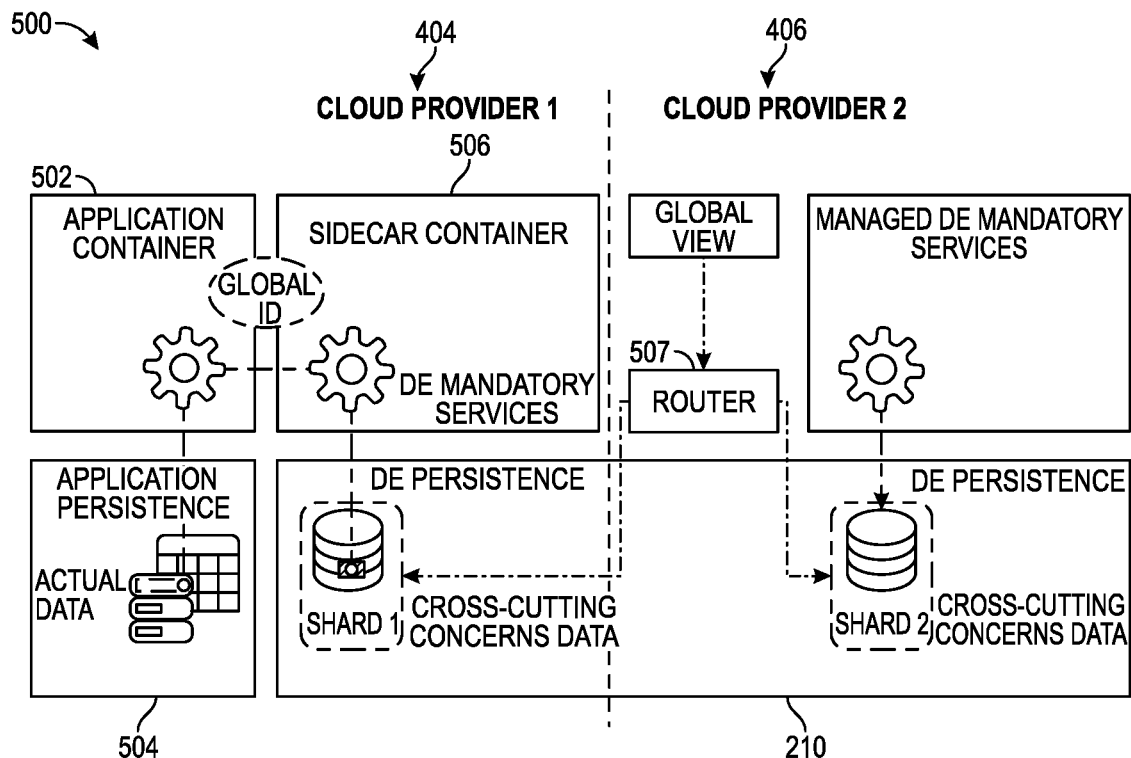
FIGS. 5A and 5B illustrate conceptual views of two embodiments of an architecture for communicating information as between cloud providers.
Figure 5B:
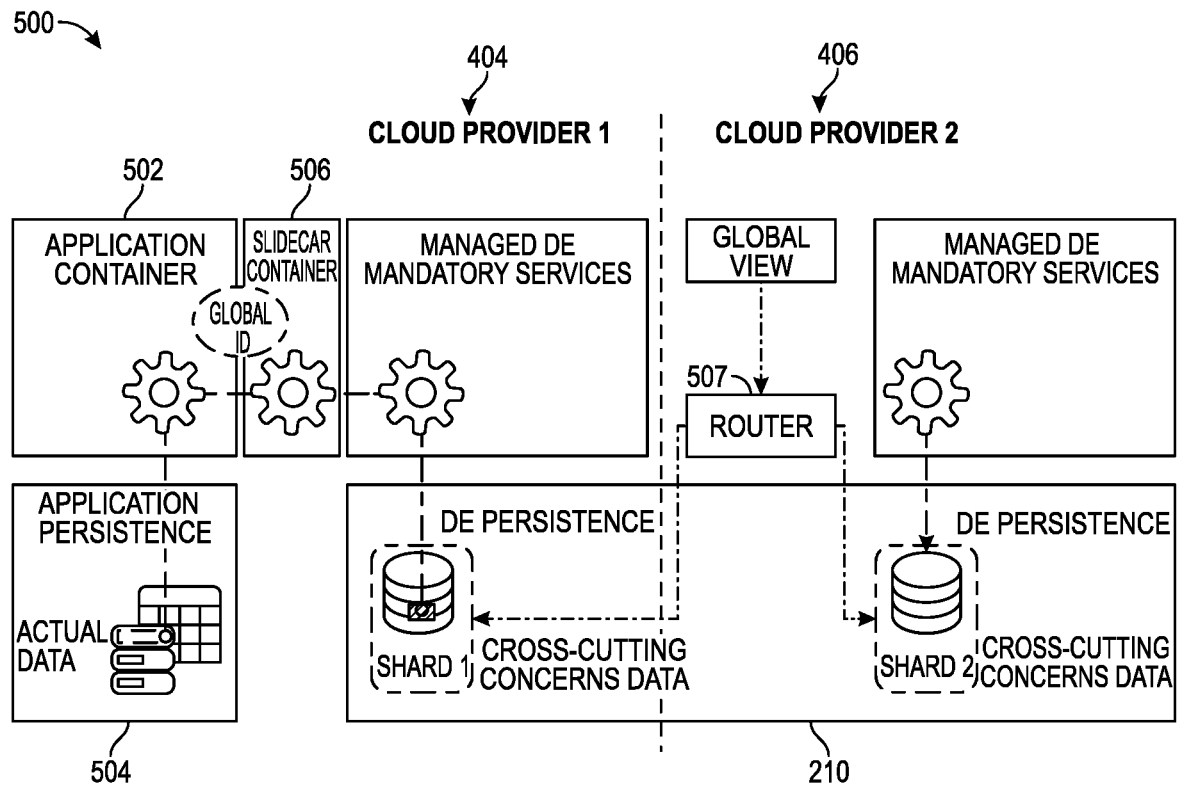

FIGS. 5A and 5B illustrate conceptual views of two embodiments of an architecture 500 for communicating information as between cloud providers. As discussed above, files and/or content may be added, retrieved, and/or updated across file types and/or domains. The different types of data may be stored in different clouds, and thus access control for passing data between storage locations and to/from an application 502 (e.g., executing a workflow in a domain) may be controlled via the data ecosystem 210, and more particularly, by the DDMSs therein. Referring to FIG. 5A, the application 502 may run in an application container, and may persist actual data in a file storage (e.g., remote or local) 504.

The application 504 may, at some point, call for storing or retrieving data from the cloud storage. The application 504 may, for example, specify a global identifier, which may be transmitted via a sidecar container 506 to the storage location in the data ecosystem 210, as discussed above. The architecture 500 may also include a router 507, which may be configured to find and retrieve data that is not present in one cloud storage provider 404, but is present in another cloud storage provider 406. The access control, security, and lineage services may be applied each time data is retrieved, stored, or modified (in some embodiments, rather than modifying data files, new versions are uploaded which may be stored along with the prior version(s)). The difference between the embodiments of FIGS. 5A and 5B is that in FIG. 5A, the "mandatory" services are run in the sidecar container 506, whereas in FIG. 5B, the "mandatory" services are run as a managed service, separately from the sidecar container.

Various different types of DDMSs are contemplated herein. For example, when external data is ingested into the data ecosystem 210 without an associated DDMS or where the data is otherwise "generic", a data management service (DMS) may be provided. The DMS may preserve the fidelity of the original data (e.g., files, external schema). Further, the DMS objects may be the building blocks of the domain users, which may eventually be supported on different cloud environments. The DMS blocks may include filestore, object store, time series, and/or others. "Stores" in this context refer to systems that store data, e.g., locally or in distributed, cloud-based architectures. The functions of the DMS may include index and share metadata with the data ecosystem, expose type oriented APIs for the different data types, e.g., read write, append, get/put, value-pairing for objects, etc.

Figure 6:
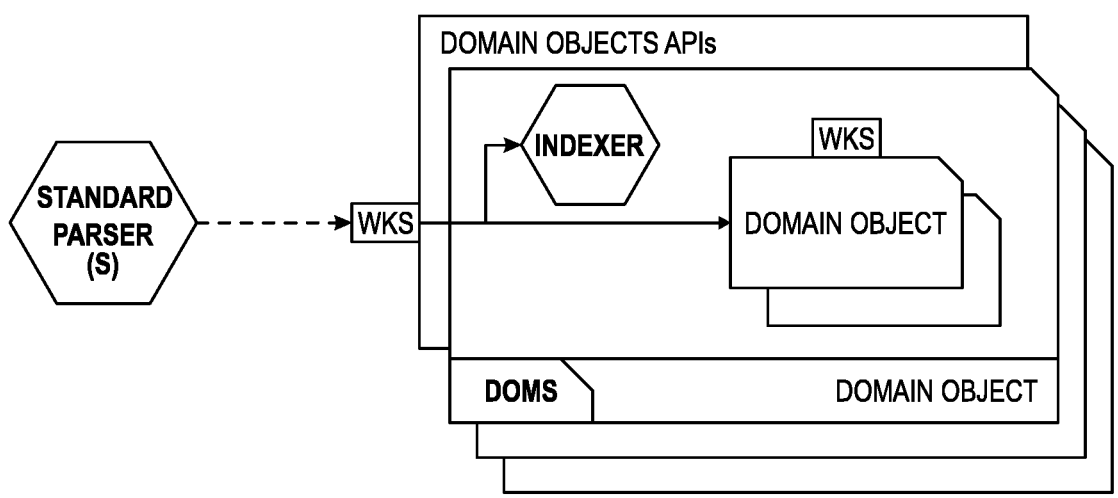
FIG. 6 illustrates a conceptual view of another domain object, in this case a domain object management service (DOMS), according to an embodiment.

FIG. 6 illustrates a conceptual view of another domain object, in this case a domain object management service (DOMS), according to an embodiment. DOMS may have APIs that expose domain objects via domain object schemas. The DOMS may be created from standards that domain teams can extend/add. DOMS setters and getters may be in standard exchange schemas (e.g., "well-known" schema or WKS). Further, the DOMS can expose additional protocols/schemas for domain objects, e.g., for different types of consumption of domain objects. Examples of such DOMs may include wellbore DOMS, seismic DOMS, and production DOMS. Further, pre-processing (e.g., parsing) may be external to the DOMS. Parsing may ensure extensibility and capture non-typesafe/free attributes. Post-processing (e.g., export) may also be external to DOMS. The DOMS may thus be domain-native data access layer building blocks. Functions of the DOMS may include ingesting parsed data formatted as domain schema (WKS), indexing and sharing metadata with the data ecosystem, and exposing domain APIs and domain schemas (WKS).

Figure 7:
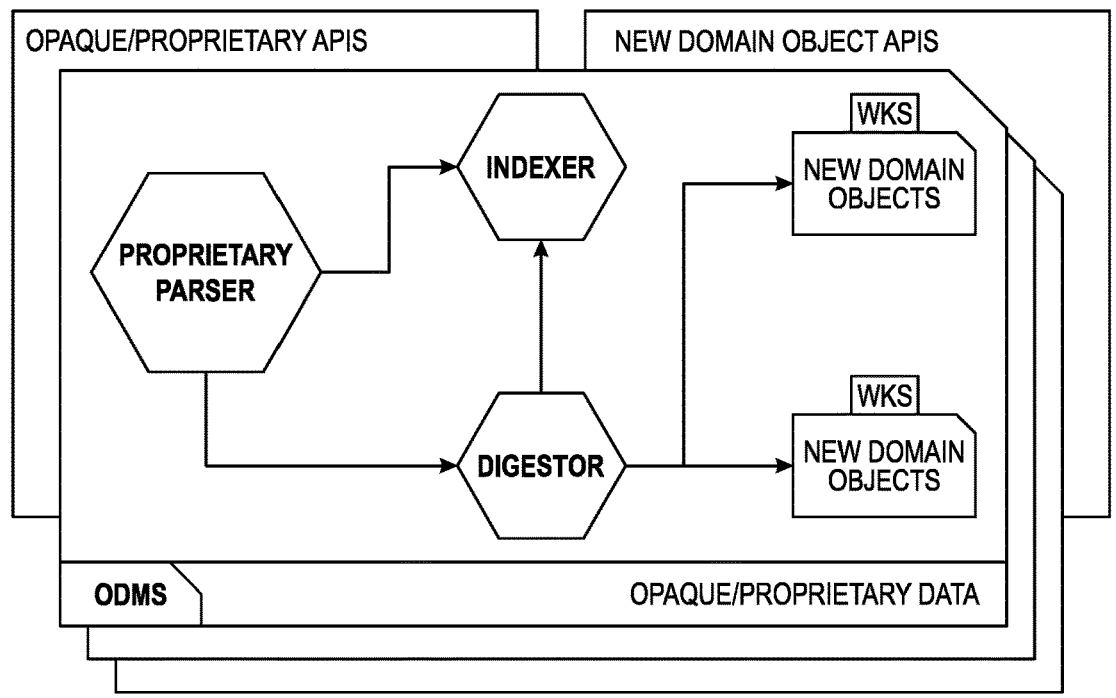
FIG. 7 illustrates a conceptual view of an opaque (or proprietary) data management service (ODMS), according to an embodiment.

FIG. 7 illustrates a conceptual view of an opaque (or proprietary) data management service (ODMS), according to an embodiment. ODMS may have the same capabilities as DOMS as well as proprietary/private data APIs. ODMS may support direct file ingestion. For example, an ODMS may be provided as a DDMS to handle a company's propriety data formats. The ODMS may align with DOMS by spawning new domain objects and/or supporting established WKS. Pre-processing (e.g., parsing) may be internal to ODMS. Post-processing (e.g., exporting) may be internal (e.g., for proprietary aspects). Functions of the ODMS may include parsing opaque/proprietary formats, indexing and sharing metadata with data ecosystem, exposing proprietary APIs (ingestion, consumption), and exposing domain APIs and domain schemas (e.g., WKS) for emerging data objects created from proprietary formats.

Figure 8:
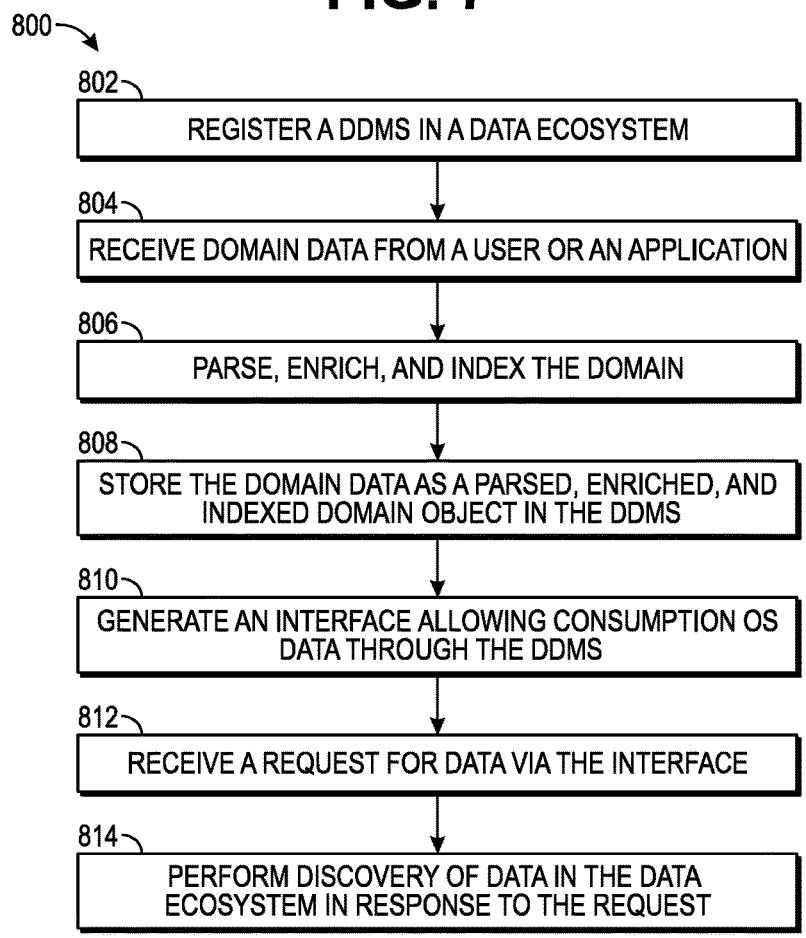
FIG. 8 illustrates a flowchart of a method that may be implemented using the various architectures discussed herein, according to an embodiment.

FIG. 8 illustrates a flowchart of a method 800 that may be implemented using the various architectures discussed herein, according to an embodiment. The method 800 may include DDMS registration, as at 802. DDMSs are registered within the data ecosystem. In this block, the association between type of data and a corresponding DDMS is received. Further, services that can write (e.g., augment) data are registered.

The method 800 may also include receiving and processing data (e.g., ingestion and enrichment of data), as at 804. For example, data in a DDMS can be persisted by a user or an application. This can be done either by directly calling DDMS API or by ingesting a file or an object that will be parsed. Parsed data can be enriched and stored as domain objects in corresponding DDMS.

The method 800 may also include providing data to a domain workflow (e.g., "consuming" data), as at 806. The DDMS may each provide a standardized set of APIs that may be used to consume the data from them. Consumption APIs may be used by applications and users to obtain the data in various domain workflows. Different DDMSs are tailored for different type of consumption (e.g., frequency, volume of data, latency, etc.), and support different types of protocols as well. Standardization of these APIs ensures easier adoption in domain workflows.

The method 800 may also include discovery of data, e.g., in support of the workflows, as at 808. In order to find relevant or useful data, the data ecosystem may provide functionality for a user or application to discover data in the ecosystem. This may be provided at least in part by the DDMSs indexing their data.

In general, the DDMSs may enforce a set of cross-cutting concerns. They also standardize a set of operational concerns as well. For example, the DDMS deployment and/or provisioning may be automated. Continuous integration and continuous deployment may be consistent with but independent of other parts of the data ecosystem. Further, DDMSs may consistently implement disaster recovery plans, e.g., for business continuity. For example, the DDMSs may support backup and restore operations and formalize a recovery point objective and a recovery time objective.

Additionally, DDMSs may be instrumented with service level indicators driving the understanding of availability and quality of the service.

Figure 9:
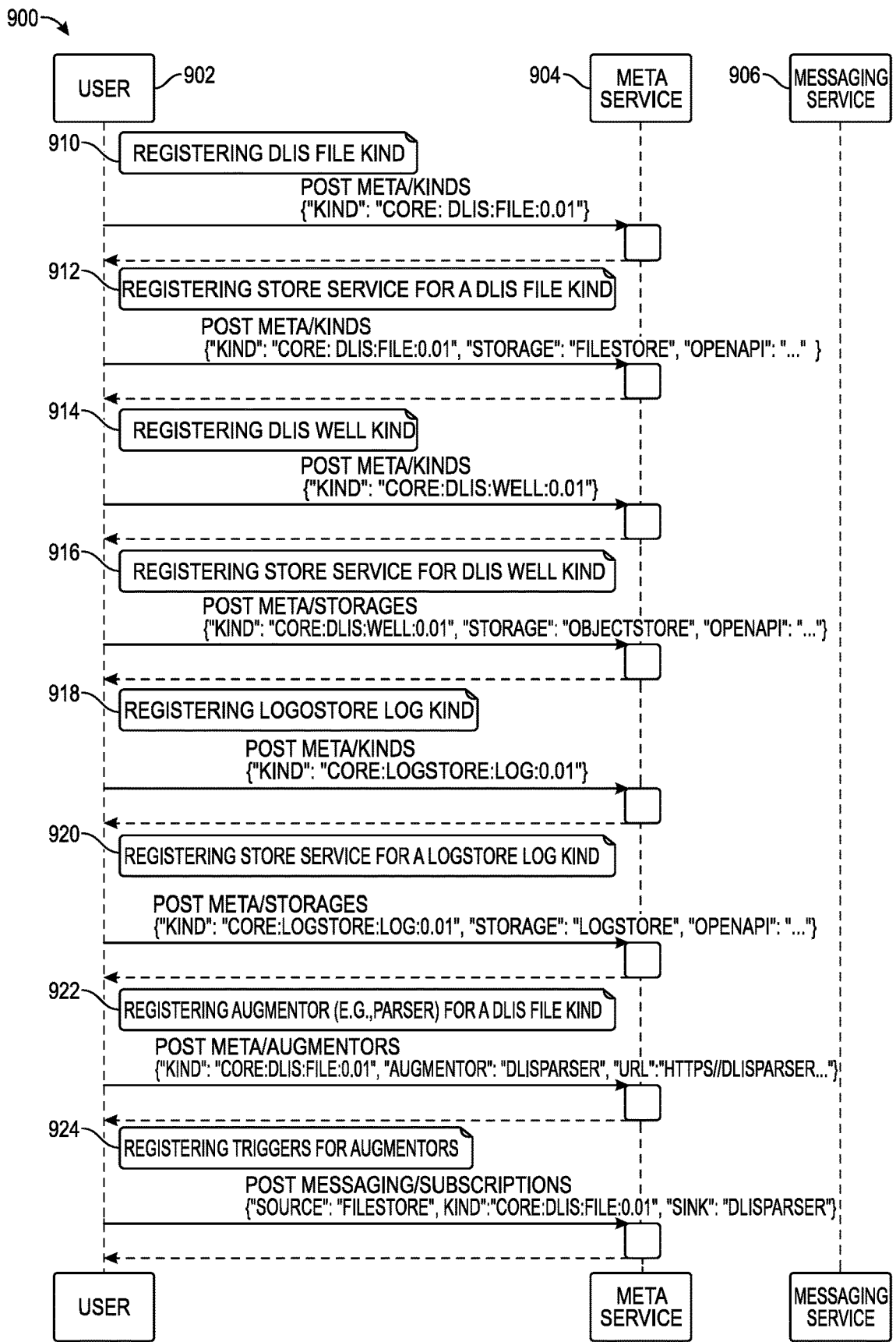
FIG. 9 illustrates a flowchart of a registration process, according to an embodiment.

FIG. 9 illustrates a flowchart of a registration process 900, e.g., for a DLIS file, according to an embodiment. A DLIS file is a log file created by sensors that monitor petroleum wells. Other files that may be registered and may have the same or similar operations as described herein for the DLIS files include unstructured, text-based and/or image-based files such as PDF, JPG, TIFF, etc. files. The DLIS file contains a database of well measurements (logs) such as resistivity, porosity, sonic, and magnetic resonance measurements. The registration process 900 may include a user 902, a meta service 904 for storing/access metadata, and a messaging service 906 for communicating with the user 902 and/or the meta service 904.

The registration process 900 may include registering a file kind, in this case, a DLIS file, as at 910. The user 902 may thus post the file kind, along with an identifier, to the meta service 904. The registration process 900 may then proceed to registering a store service for the DLIS file kind, as at 912. For example, the user 902 may post the file kind (DLIS), the file identifier, as well as the location of the storage and an API to open the file. The registration process 900 may then proceed to registering the DLIS well kind (e.g., a data object related to the well being monitored as reflected in the logs in the DLIS file), as at 914, again by passing a kind and an identifier to the meta service 906. The registration process 900 then may proceed to registering a store service for the DLIS well kind, as at 916. The registration process 900 may continue by registering a logstore log kind at 918 (e.g., related to the individual logs contained within a single DLIS file), registering a store service for a logstore log kind at 920, registering an augmenter (e.g., a parser) for the DLIS file type, as at 922, and registering "triggers" for the augmenters, as at 924. Such triggers may be events that cause the parser or other augmenter to be employed to perform one or more processes using the raw data of the file.

Figure 10:
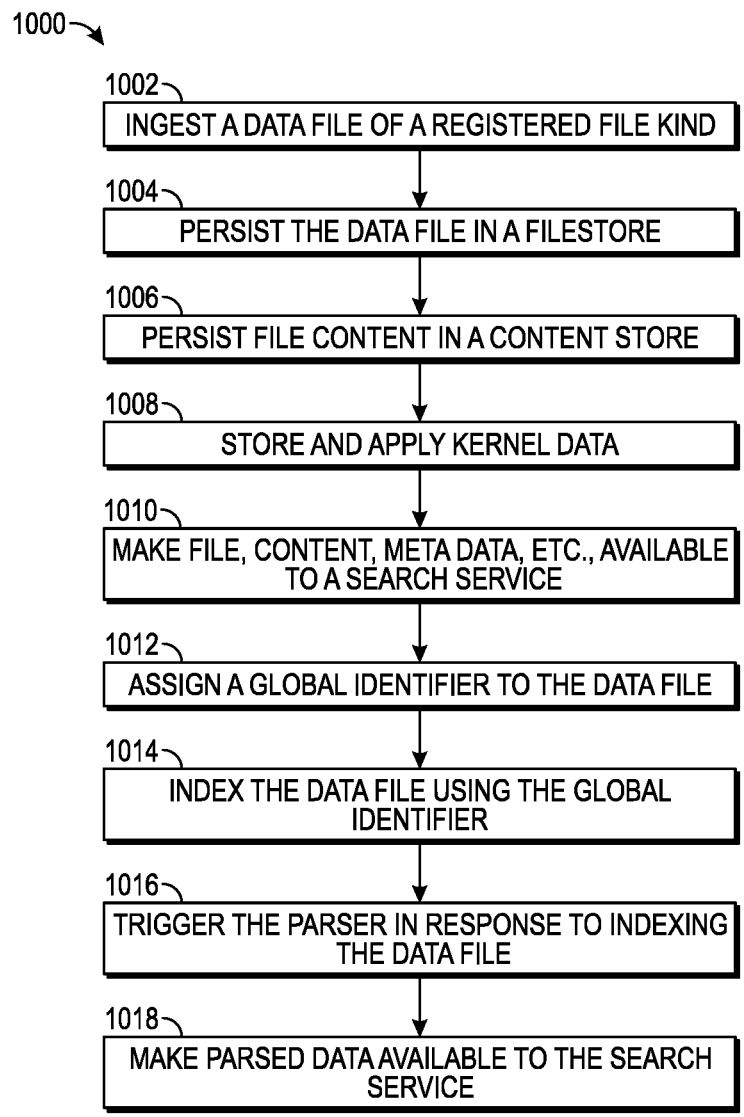
FIG. 10 illustrates a simplified view of a flowchart for an ingestion and enrichment process for a file kind, according to an embodiment.

FIG. 10 illustrates a simplified view of a flowchart for an ingestion and enrichment process 1000 for a file kind, continuing with the example from FIG. 9, a DLIS file, according to an embodiment. The process 1000 may commence by a user "ingesting" a file of the file kind (or type) into the ecosystem, as at 1002, e.g., by storing a file which is then transferred, e.g., by an application, to the data ecosystem. The process 1000 may then proceed to a filestore service persisting the file, as at 1004. Content in the file may then be passed to a content service, which may persist the content, as at 1006. A kernel service may store and apply kernel data, e.g., entitlements, legal tags, any other meta data, and lineage in association with the data file/content, e.g., based on the registered aspects of the file kind, as at 1008. The data file, content, etc., may then be made available to a search service, as at 1010, e.g., for subsequent discovery by file type, file identifier, source type, well type, etc. A global identifier may be associated with the data file and returned to the user, as at 1012. Next the file data may be indexed, as at 1014, which may also include applying the kernel service, e.g., to maintain the entitlements, legal tags, meta data, lineage, etc.

The parser may then be triggered, as at 1016. This may include extracting content from the data file, which may be persisted in the content store, e.g., while checking and/or applying the kernel data in the kernel service. The parser may parse the data for each individual log in the data file, again checking/applying the kernel data. The parsed data may be passed back to the searching service, as at 1018, so as to allow updating of data log and the lineage thereof.

Figure 11:
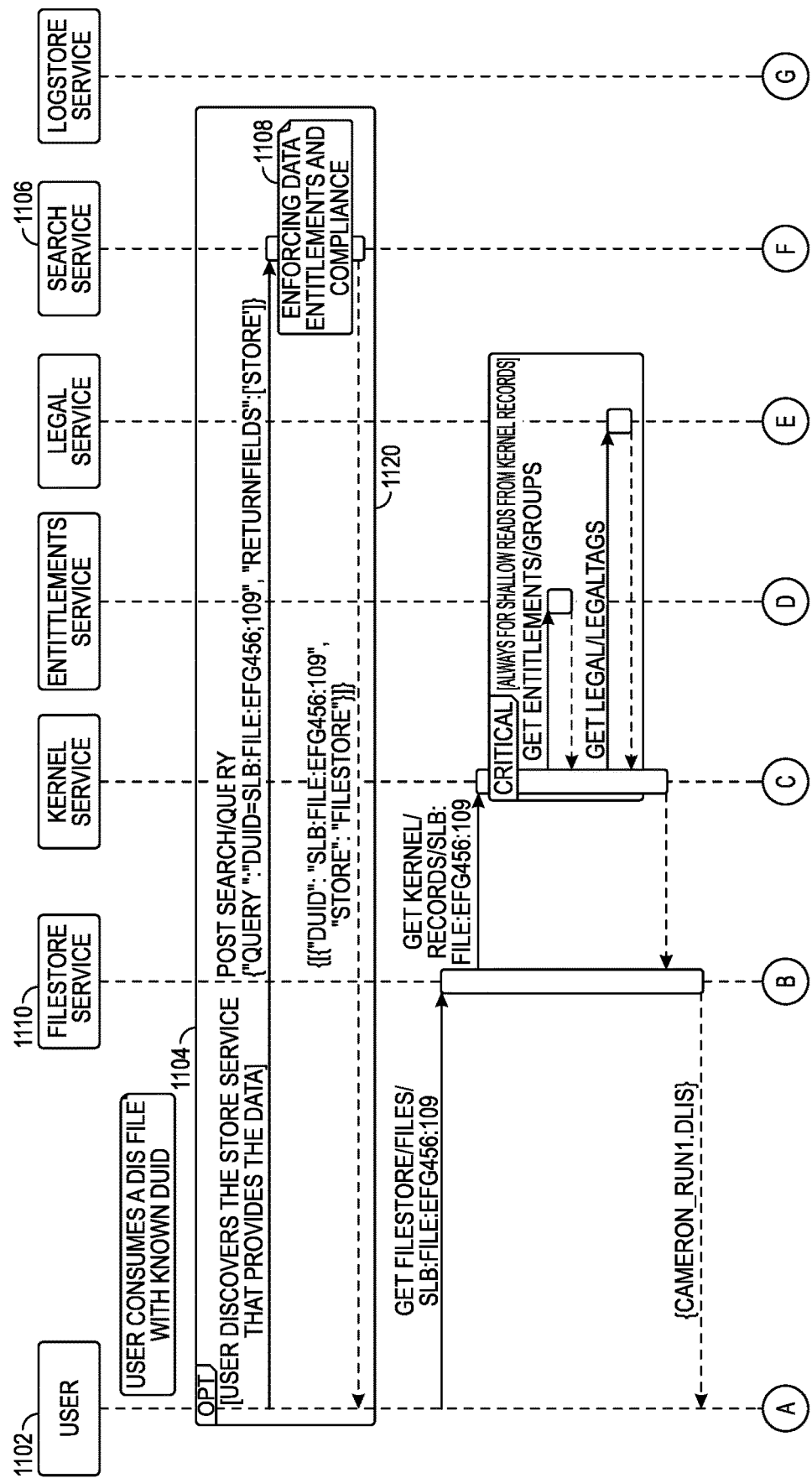
FIG. 11 illustrates a flowchart for a consumption process using the data ecosystem and the DDMSs, according to an embodiment.
Figure 11:
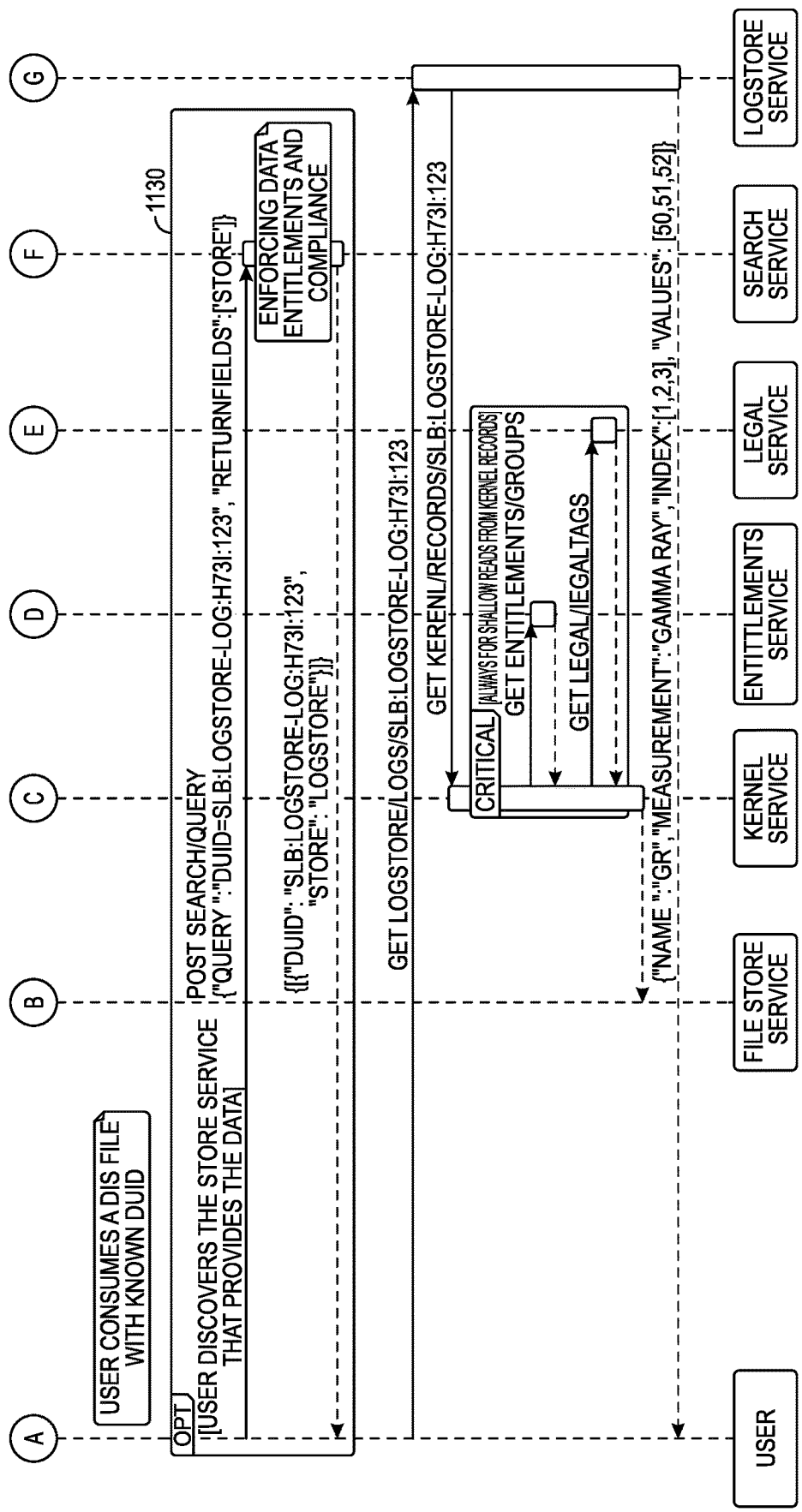

FIG. 11 illustrates a flowchart for a consumption process 1100 using the data ecosystem and the DDMSs, according to an embodiment. The consumption process 1100 may optionally include a user 1102 discovering a store service that provides the data, as at 1104. The search service 1106 may enable such discovery, and may enforce the data entitlements and compliance (e.g., the kernel data), as at 1108. The store service may then be returned to the user 1102. The user 1102 may also request the filestore that includes the data. The filestore service 1110 may, however, first ensure that entitlements, legal requirements, etc. are met for the user with respect to the requested data. If they are, the requested file may be returned to the user 1102 as at 1120.

In some cases, a user may consume a log with a known global identifier, as in box 1130. This may include searching for the logstore (which stores the log) using the search service 1106, returning the logstore to the user 1102. The process 1100 may also include getting the actual log from the logstore, e.g., again ensuring that entitlements, legal compliance, etc. are met, and returning it to the user 1102.

Figure 12:
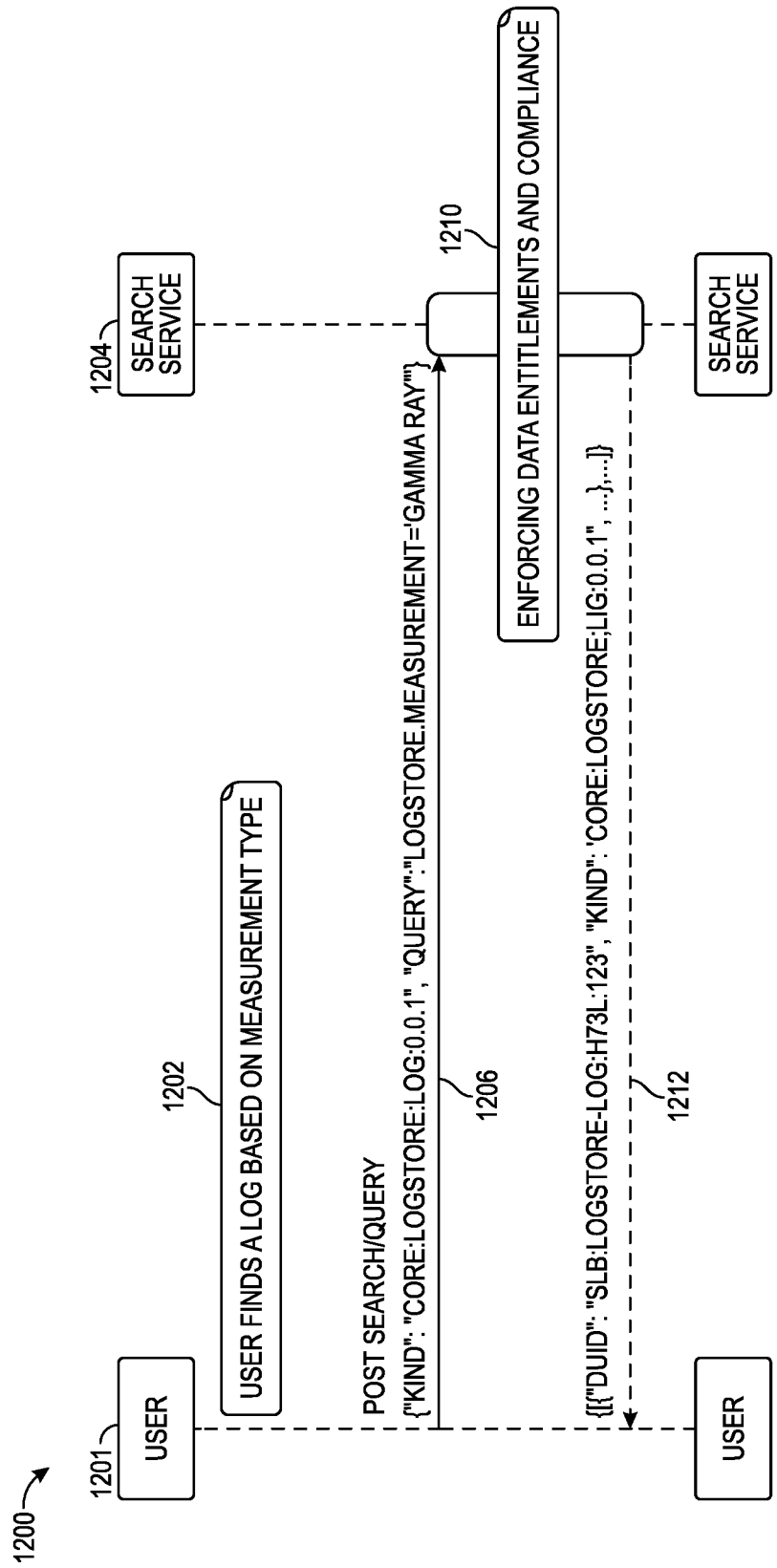
FIG. 12 illustrates a flowchart of a discovery process, according to an embodiment.

FIG. 12 illustrates a flowchart of a discovery process 1200, according to an embodiment. The discovery process 1200 may include a user 1201 finding a log based on a measurement type (or any other parameter or search value), as at 1202. For example, the process 1200 may include posting a search query to a search service 1204, as at 1206. The search query may specify a file kind, a location of a log or log store, and a type of measurement, for example. The search service 1204 may enforce data entitlements and compliance, as at 1210. The search service 1204 may then return the log to the user 1201, as at 1212.

Figure 13:
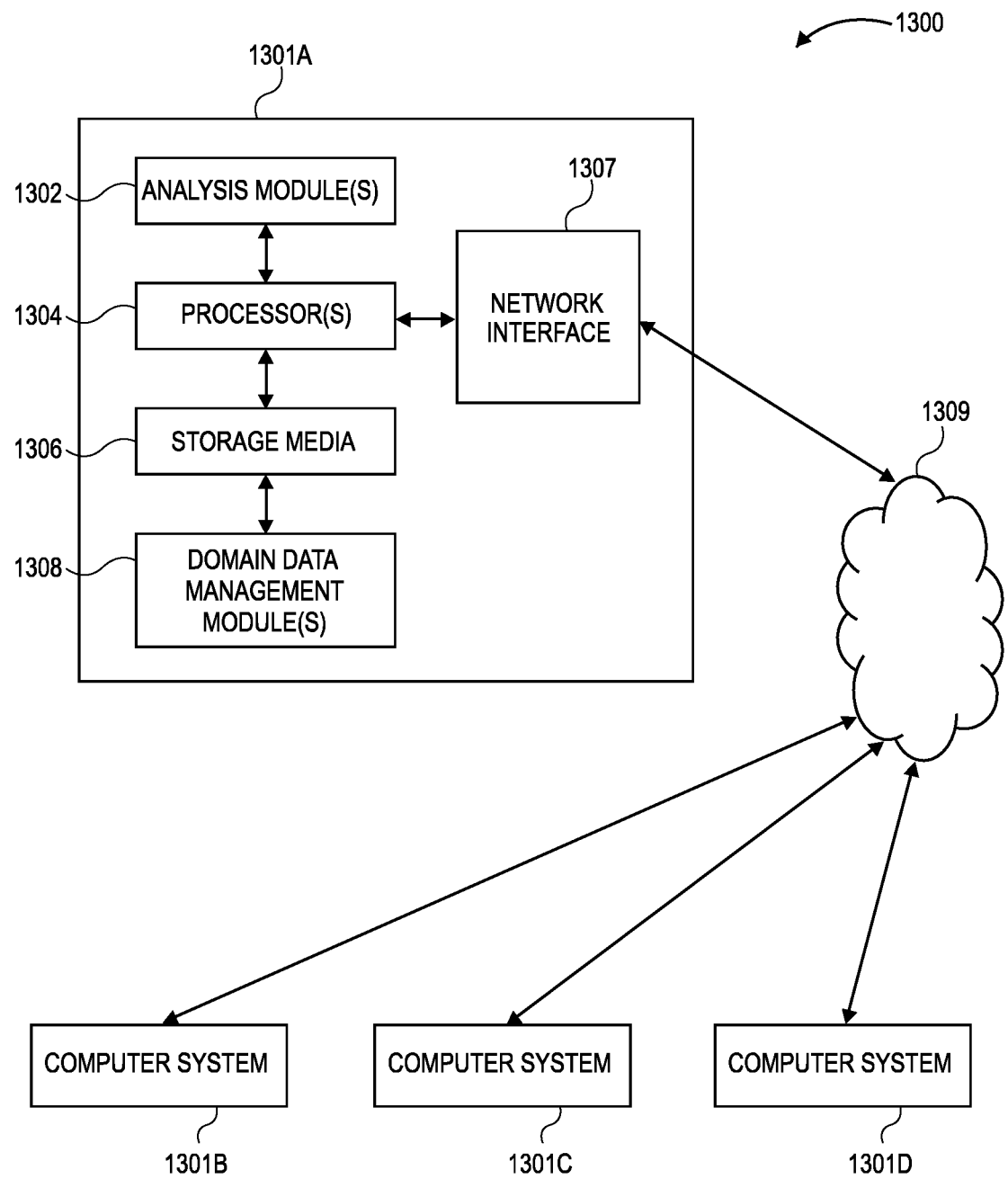
FIG. 13 illustrates a schematic view of a computing system, according to an embodiment.

In some embodiments, the methods of the present disclosure may be executed by a computing system. FIG. 13 illustrates an example of such a computing system 1300, in accordance with some embodiments. The computing system 1300 may include a computer or computer system 1301A, which may be an individual computer system 1301A or an arrangement of distributed computer systems. The computer system 1301A includes one or more analysis modules 1302 that are configured to perform various tasks according to some embodiments, such as one or more methods disclosed herein. To perform these various tasks, the analysis module 1302 executes independently, or in coordination with, one or more processors 1304, which is (or are) connected to one or more storage media 1306. The processor(s) 1304 is (or are) also connected to a network interface 1307 to allow the computer system 1301A to communicate over a data network 1309 with one or more additional computer systems and/or computing systems, such as 1301B, 1301C, and/or 1301D (note that computer systems 1301B, 1301C and/or 1301D may or may not share the same architecture as computer system 1301A, and may be located in different physical locations, e.g., computer systems 1301A and 1301B may be located in a processing facility, while in communication with one or more computer systems such as 1301C and/or 1301D that are located in one or more data centers, and/or located in varying countries on different continents).

A processor may include a microprocessor, microcontroller, processor module or subsystem, programmable integrated circuit, programmable gate array, or another control or computing device.

The storage media 1306 may be implemented as one or more computer-readable or machine-readable storage media. Note that while in the example embodiment of FIG. 13 storage media 1306 is depicted as within computer system 1301A, in some embodiments, storage media 1306 may be distributed within and/or across multiple internal and/or external enclosures of computing system 1301A and/or additional computing systems. Storage media 1306 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above may be provided on one computer-readable or machine-readable storage medium, or may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

In some embodiments, computing system 1300 contains one or more domain data management module(s) 1308. In the example of computing system 1300, computer system 1301A includes the domain data management module 1308. In some embodiments, a single domain data management module may be used to perform some aspects of one or more embodiments of the methods disclosed herein. In other embodiments, a plurality of domain data management modules may be used to perform some aspects of methods herein.

It should be appreciated that computing system 1300 is merely one example of a computing system, and that computing system 1300 may have more or fewer components than shown, may combine additional components not depicted in the example embodiment of FIG. 13, and/or computing system 1300 may have a different configuration or arrangement of the components depicted in FIG. 13. The various components shown in FIG. 13 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are included within the scope of the present disclosure.

Computational interpretations, models, and/or other interpretation aids may be refined in an iterative fashion; this concept is applicable to the methods discussed herein. This may include use of feedback loops executed on an algorithmic basis, such as at a computing device (e.g., computing system 1300, FIG. 13), and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments.

However, the illustrative discussions above are not intended to be exhaustive or limiting to the precise forms disclosed. Many modifications and variations are possible in view of the above teachings. Moreover, the order in which the elements of the methods described herein are illustrate and described may be re-arranged, and/or two or more elements may occur simultaneously. The embodiments were chosen and described in order to best explain the principals of the disclosure and its practical applications, to thereby enable others skilled in the art to best utilize the disclosed embodiments and various embodiments with various modifications as are suited to the particular use contemplated.

What is claimed is:

1. A method, comprising:
registering a type of data file, wherein the registering the type of data file comprises:
posting a file type and an identifier to a meta service, and
storing metadata describing the type of data file, the metadata including a file storage service and a parser for the type of data file;
receiving a first data file of the type of data file from a first domain, the first data file comprising raw data;
storing the first data file using the file storage service;
storing one or more access rules and a lineage of the first data file using a kernel storage service;
parsing the first data file using the parser to generate a content from the raw data;
storing the content using a content storage service, separately from the raw data;
providing the first data file and the content to a search service for subsequent discovery by at least one of a file type, a file identifier, and a source type;
automatically updating one or more second data files from one or more other domains based on the content of the first data file using the search service and the lineage; and
enabling access to federated indices that provide reference to raw data files and parsed content stored by different domains, wherein:
the parser is triggered in response to indexing the data file.

2. The method of claim 1, further comprising indexing the first data file using a first identifier, wherein the content, the lineage, and the access rules are associated with and accessible using the first identifier.

3. The method of claim 1, wherein the registering further comprises storing a trigger for the parser, wherein the parser parses the first data file in response to the trigger being true.

4. The method of claim 1, wherein the lineage specifies one or more data files or one or more data objects from which the first data file was at least partially derived.

5. The method of claim 1, wherein the type of data file is a well log file storing one or more logs of sensor measurements taken from one or more wells.

6. The method of claim 1, wherein the type of data file is an unstructured, text-based data file.

7. The method of claim 1, further comprising:
receiving a request for the first data file from a user;
determining that access controls permit the first data file to be provided to the user; and
providing the first data file to the user.

8. The method of claim 1, further comprising:
receiving, from a user, a request for a file store that includes the first data file;
determining that access controls permit the file store to be provided to the user; and
providing the file store to the user.

9. A non-transitory computer-readable medium storing instructions that, when executed by at least one processor of a computing system, cause the computing system to perform operations, the operations comprising:
registering a type of data file, wherein the registering the type of data file comprises:
posting a file type and an identifier to a meta service, and
storing metadata describing the type of data file, the metadata including a file storage service and a parser for the type of data file;
receiving a first data file of the type of data file from a first domain, the first data file comprising raw data;
storing the first data file using the file storage service;
storing one or more access rules and a lineage of the first data file using a kernel storage service;
parsing the first data file using the parser to generate a content from the raw data;
storing the content using a content storage service, separately from the raw data;
providing the first data file and the content to a search service for subsequent discovery by at least one of a file type, a file identifier, and a source type;
automatically updating one or more second data files from one or more other domains based on the content of the first data file using the search service and the lineage; and
enabling access to federated indices that provide reference to raw data files and parsed content stored by different domains, wherein:
the parser is triggered in response to indexing the data file.

10. The medium of claim 9, wherein the operations further comprise indexing the first data file using a first identifier, wherein the content, the lineage, and the access rules are associated with and accessible using the first identifier.

11. The medium of claim 9, wherein the registering further comprises storing a trigger for the parser, wherein the parser parses the first data file in response to the trigger being true.

12. The medium of claim 9, wherein the lineage specifies one or more data files or one or more data objects from which the first data file was at least partially derived.

13. The medium of claim 9, wherein the type of data file is a well log file storing one or more logs of sensor measurements taken from one or more wells.

14. The medium of claim 9, wherein the type of data file is an unstructured, text-based data file.

15. The medium of claim 9, wherein the operations further comprise:
receiving a request for the first data file from a user;
determining that access controls permit the first data file to be provided to the user; and
providing the first data file to the user.

16. The medium of claim 9, wherein the operations further comprise:
receiving, from a user, a request for a file store that includes the first data file;
determining that access controls permit the file store to be provided to the user; and
providing the file store to the user.

17. A computing system, comprising:
one or more processors; and
a memory system comprising one or more non-transitory computer-readable media storing instructions that, when executed by at least one of the one or more processors, cause the computing system to perform operations, the operations comprising:

registering a type of data file, wherein the registering the type of data file comprises:
  posting a file type and an identifier to a meta service, and
  storing metadata describing the type of data file, the metadata including a file storage service and a parser for the type of data file;
receiving a first data file of the type of data file from a first domain, the first data file comprising raw data;
storing the first data file using the file storage service;
storing one or more access rules and a lineage of the first data file using a kernel storage service;
parsing the first data file using the parser to generate a content from the raw data;
storing the content using a content storage service, separately from the raw data;
providing the first data file and the content to a search service for subsequent discovery by at least one of a file type, a file identifier, and a source type;
automatically updating one or more second data files from one or more other domains based on the content of the first data file using the search service and the lineage; and
enabling access to federated indices that provide reference to raw data files and parsed content stored by different domains, wherein:
  the parser is triggered in response to indexing the data file.

18. The system of claim 17, wherein the operations further comprise indexing the first data file using a first identifier, wherein the content, the lineage, and the access rules are associated with and accessible using the first identifier.

19. The system of claim 17, wherein the registering further comprises storing a trigger for the parser, wherein the parser parses the first data file in response to the trigger being true.

20. The system of claim 17, wherein the lineage specifies one or more data files or one or more data objects from which the first data file was at least partially derived.

* * * * *